(12) United States Patent
Kohigashi

(10) Patent No.: US 10,399,411 B2
(45) Date of Patent: Sep. 3, 2019

(54) DAMPER OPENING/CLOSING MECHANISM OF VEHICLE AIR-CONDITIONING DEVICE

(71) Applicant: MITSUBISHI HEAVY INDUSTRIES THERMAL SYSTEMS, LTD., Minato-ku, Tokyo (JP)

(72) Inventor: Hirotsugu Kohigashi, Aichi (JP)

(73) Assignee: MITSUBISHI HEAVY INDUSTRIES THERMAL SYSTEMS, LTD., Tokyo (JP)

(*) Notice: Subject to any disclaimer, the term of this patent is extended or adjusted under 35 U.S.C. 154(b) by 0 days.

(21) Appl. No.: 15/558,065

(22) PCT Filed: Feb. 5, 2016

(86) PCT No.: PCT/JP2016/053449
§ 371 (c)(1),
(2) Date: Sep. 13, 2017

(87) PCT Pub. No.: WO2016/158006
PCT Pub. Date: Oct. 6, 2016

(65) Prior Publication Data
US 2018/0065445 A1 Mar. 8, 2018

(30) Foreign Application Priority Data
Mar. 30, 2015 (JP) .................................. 2015-069151

(51) Int. Cl.
*B60H 1/00* (2006.01)
*F16K 31/04* (2006.01)
*F16K 31/524* (2006.01)

(52) U.S. Cl.
CPC ....... *B60H 1/00857* (2013.01); *B60H 1/0065* (2013.01); *B60H 1/00428* (2013.01);
(Continued)

(58) Field of Classification Search
CPC ............ B60H 1/00857; B60H 1/00664; B60H 1/00671; B60H 1/00707; B60H 1/0042;
(Continued)

(56) References Cited

U.S. PATENT DOCUMENTS 9,493,052 B2* 11/2016 Hara ................... B60H 1/00857
2007/0144303 A1* 6/2007 Sato ...................... B60H 1/0065
74/519

(Continued)

FOREIGN PATENT DOCUMENTS

JP 62-115916 U 7/1987
JP 63-179214 U 11/1988
(Continued)

OTHER PUBLICATIONS

Machine translation for JPH10278548A.*

*Primary Examiner* — Ian G Paquette
(74) *Attorney, Agent, or Firm* — Birch, Stewart, Kolasch & Birch, LLP

(57) ABSTRACT

Provided is a damper opening/closing mechanism of a vehicle air-conditioning device, the damper opening/closing mechanism being configured such that a pin (28) of a damper lever (26) is fitted in a cam groove (24) of a link plate (22) rotatably driven by a stepping motor and that a damper (19) is opened/closed through the damper lever (26) rotated by rotation of the link plate (22). One end portion of the cam groove (24) for reference positioning of the stepping motor is in such a shape that a connection surface (32) not contacting an outer peripheral surface of the pin (28) connects between the point of contact of the outer periphery of the pin (28) with one end surface of the cam groove (24) and the point with a side wall surface (24A) of the cam groove (24) when the damper (19) is in a closed state.

2 Claims, 4 Drawing Sheets

(52) U.S. Cl.
CPC ....... *B60H 1/00507* (2013.01); *F16K 31/043* (2013.01); *F16K 31/52441* (2013.01)

(58) Field of Classification Search
CPC ............ B60H 1/00428; B60H 1/00507; B60H 1/00514; B60H 1/0065; B60H 1/00864; B60H 2001/003; F16K 31/52441; F16K 31/043

See application file for complete search history.

(56) References Cited

U.S. PATENT DOCUMENTS

| | | | |
|---|---|---|---|
| 2008/0035745 A1* | 2/2008 | Sudoh ................ | B60H 1/00671 236/99 G |
| 2008/0182500 A1* | 7/2008 | Jessen ................ | B60H 1/00671 454/155 |
| 2012/0184197 A1* | 7/2012 | Mayer ................ | B60H 1/00671 454/155 |

FOREIGN PATENT DOCUMENTS

| | | | |
|---|---|---|---|
| JP | 64-55111 U | | 4/1989 |
| JP | 5-25291 Y2 | | 6/1993 |
| JP | 10-47449 A | | 2/1998 |
| JP | 10278548 A | * | 10/1998 |
| JP | 4168583 B2 | | 10/2008 |

* cited by examiner

DAMPER OPENING/CLOSING MECHANISM OF VEHICLE AIR-CONDITIONING DEVICE

TECHNICAL FIELD

The present invention relates to a damper opening/closing mechanism of a vehicle air-conditioning device, the damper opening/closing mechanism including a link plate provided with cam grooves and configured to rotate the link plate by a stepping motor to open/close a damper.

BACKGROUND ART

A heating ventilation and air conditioning (HVAC) unit as a unit forming a vehicle air-conditioning device is configured to selectively blow air into a vehicle compartment through any of a face blowing port, a foot blowing port, and a differential blowing port to adjust the temperature of the inside of the vehicle compartment, the air being temperature-adjusted to a set temperature through an evaporator, a heater core, an air mix damper, etc. arranged inside the unit.

In addition to the air mix damper, a plurality of blowing mode switching dampers configured to open/close each blowing port, such as a face/differential damper and a foot damper, are rotatably supported through corresponding damper shafts in the HVAC unit. These dampers are opened/closed through a link mechanism including a link plate rotated by, e.g., a motor actuator with a potentiometer or a stepping motor and a damper lever having a pin slidably fitted in a cam groove provided at the link plate, for example. In this manner, temperature adjustment control or switching of a blowing mode is performed (see, e.g., Patent Citations 1 and 2).

In a damper opening/closing mechanism configured to open/close, as described above, each damper through the link mechanism including the link plate with the cam groove, the damper lever, etc., the pin provided at the damper lever and having a circular cross section is slidably fitted in the cam groove of the link plate. Thus, the cam groove has such a groove width that the pin is fitted with a certain clearance, and an end portion of the cam groove has generally an arc shape with a radius of ½ of the groove width as described in Patent Citations 1 and 2.

CITATION LIST

Patent Citations

Patent Citation 1:
The Publication of Japanese Patent No. 4168583
Patent Citation 2:
Japanese Examined Utility Model Application, Publication No. H5-25291

DISCLOSURE OF INVENTION

In the damper opening/closing mechanism configured to rotate, by the stepping motor, the link plate provided with the cam groove as described above, reference positioning (initialization) of the stepping motor needs to be performed. Such initialization is normally performed in such a manner that the link plate is rotated such that the pin of the damper lever is positioned at one end portion of the cam groove and that the damper is in a closed state to press the damper against a seal surface. However, depending on the direction of the damper lever, the damper lever might rotate in the direction of opening the damper upon initialization, leading to unstable initialization.

That is, as illustrated in FIGS. 4A and 4B, when the state of FIG. 4A, i.e., a state in which a link plate 1 is rotated in an N direction to cause a pin 4 of a damper lever 3 to contact one end portion of a cam groove 2 and a damper 5 is rotated about a damper shaft 6 to contact a seal surface 7, is brought upon initialization, if the direction of the pin 4 of the damper lever 3 is in the direction of load on the pin 4, torque in the direction of opening the damper 5 is applied to the damper lever 3. Thus, as illustrated in FIG. 4B, the pin 4 of the damper lever 3 returns along an arc surface of the end portion of the cam groove 2 by a clearance, and therefore, the damper 5 is opened. Thus, there is a probability that initialization is unstable.

The present invention has been made in view of the above-described situation. The present invention is intended to provide a damper opening/closing mechanism of a vehicle air-conditioning device configured to open/close a damper through a damper lever provided with a pin slidably fitted in a cam groove of a link plate rotated by a stepping motor, the damper opening/closing mechanism being configured so that the stepping motor can be stably initialized regardless of the direction of the damper lever.

For solving the above-described problem, the damper opening/closing mechanism of the vehicle air-conditioning device of the present invention employs the following solutions.

That is, a damper opening/closing mechanism of a vehicle air-conditioning device of one aspect of the present invention includes a link plate configured such that a center portion is rotatably supported and provided with a cam groove along an outer peripheral portion and the link plate is rotatably driven through a stepping motor, a damper lever including a pin to be slidably fitted in the cam groove and configured to rotate by movement of the pin through the cam groove, and a damper including a damper shaft having a shaft end coupled to the damper lever and configured to open/close by rotation of the damper shaft. One end portion of the cam groove for reference positioning of the stepping motor is in such a shape that a curved surface and/or a flat surface not contacting an outer peripheral surface of the pin connects between points A and B, the point A being the point of contact of an outer periphery of the pin with one end surface of the cam groove and the point B being the point of contact of the outer periphery of the pin with a side wall surface of the cam groove when the damper is in a closed state.

According to the above-described configuration, in the damper opening/closing mechanism configured such that the pin of the damper lever is fitted in the cam groove of the link plate rotatably driven by the stepping motor and that the damper is opened/closed through the damper lever rotated by rotation of the link plate, in a case where the point of contact of the outer periphery of the pin with one end surface of the cam groove is A and the point of contact of the outer periphery of the pin with the side wall surface of the cam groove is B when the damper is at a closed position, one end portion of the cam groove for reference positioning of the stepping motor is in such a shape that the curved surface and/or the flat surface not contacting the outer peripheral surface of the pin connects between the points A and B. Thus, when reference positioning (initialization) of the stepping motor is performed in a state in which the link plate is rotated such that the pin of the damper lever is positioned at one end portion of the cam groove and that the damper is in the closed state, torque in a rotation direction of the damper lever might be applied depending on the direction of the damper lever. However, one end portion of the cam groove is in the above-described shape. Thus, when the pin of the damper lever is positioned at one end portion of the cam groove and the damper is in the closed state, the outer periphery of the pin is housed in contact with the points A and B. Consequently, there is no clearance between the pin and the cam groove, the damper lever being rotatable in such a clearance. Initialization can be, without rotation of the damper lever in the direction of opening the damper, performed in a state in which the damper is maintained at the closed position. Thus, opening of the damper by rotation of the damper lever due to returning of the pin on the arc surface by the clearance between the cam groove and the pin is prevented, and therefore, stable initialization can be performed. This can improve the quality and reliability of the vehicle air-conditioning device.

Further, the damper opening/closing mechanism of the vehicle air-conditioning device of one aspect of the present invention is the damper opening/closing mechanism of the vehicle air-conditioning device as described above, in which the one end portion of the cam groove is in such a shape that a curved surface having a curvature radius r smaller than a curvature radius R of the pin connects between a plane passing through the point A and an extending plane of the side wall surface of the cam groove passing through the point B.

According to the above-described configuration, one end portion of the cam groove is in such a shape that the curved surface having the curvature radius r smaller than the curvature radius R of the pin connects between the plane passing through the point A and the extending plane of the side wall surface of the cam groove passing through the point B. Thus, when the link plate is rotated such that the pin of the damper lever is positioned at one end portion of the cam groove and that the damper is in the closed state, the outer peripheral surface of the pin contacts the point A of one end surface of the cam groove and the point B of the side wall surface of the cam groove, and the pin can be securely housed at one end portion of the cam groove without any pin-movable clearances. Thus, even when the torque in the rotation direction is applied to the damper lever, the pin does not move at one end portion of the cam groove, and initialization of the stepping motor can be stably performed with the damper being maintained in the closed state regardless of the direction of the damper lever.

When reference positioning (initialization) of the stepping motor is performed in a state in which the link plate is rotated such that the pin of the damper lever is positioned at one end portion of the cam groove and that the damper is in the closed state, the torque in the rotation direction of the damper lever might be applied depending on the direction of the damper lever. However, one end portion of the cam groove is in the above-described shape. Thus, when the pin of the damper lever is positioned at one end portion of the cam groove and the damper is in the closed state, the outer periphery of the pin is housed in contact with the points A and B. Consequently, there is no clearance between the pin and the cam groove, the damper lever being rotatable in such a clearance. Initialization can be, without rotation of the damper lever in the direction of opening the damper, performed in the state in which the damper is maintained at the closed position. Thus, opening of the damper by rotation of the damper lever due to returning of the pin on the arc surface by the clearance between the cam groove and the pin is prevented, and therefore, stable initialization can be performed. This can improve the quality and reliability of the vehicle air-conditioning device.

BEST MODE FOR CARRYING OUT THE INVENTION

One embodiment of the present invention will be described below with reference to FIGS. 1 to 4.

Figure 1:
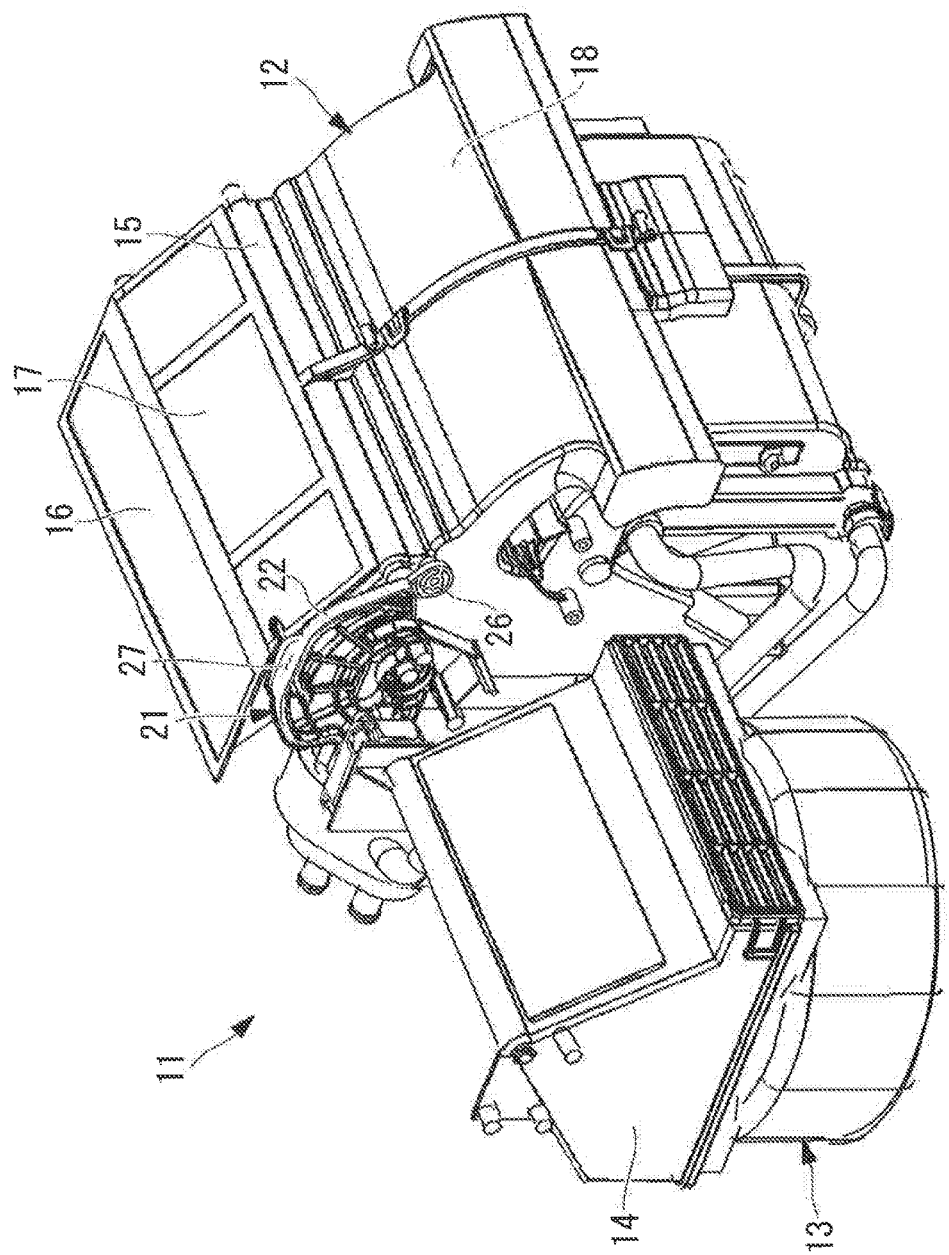
FIG. 1 is a perspective view of a vehicle air-conditioning device of one embodiment of the present invention.
Figure 2:
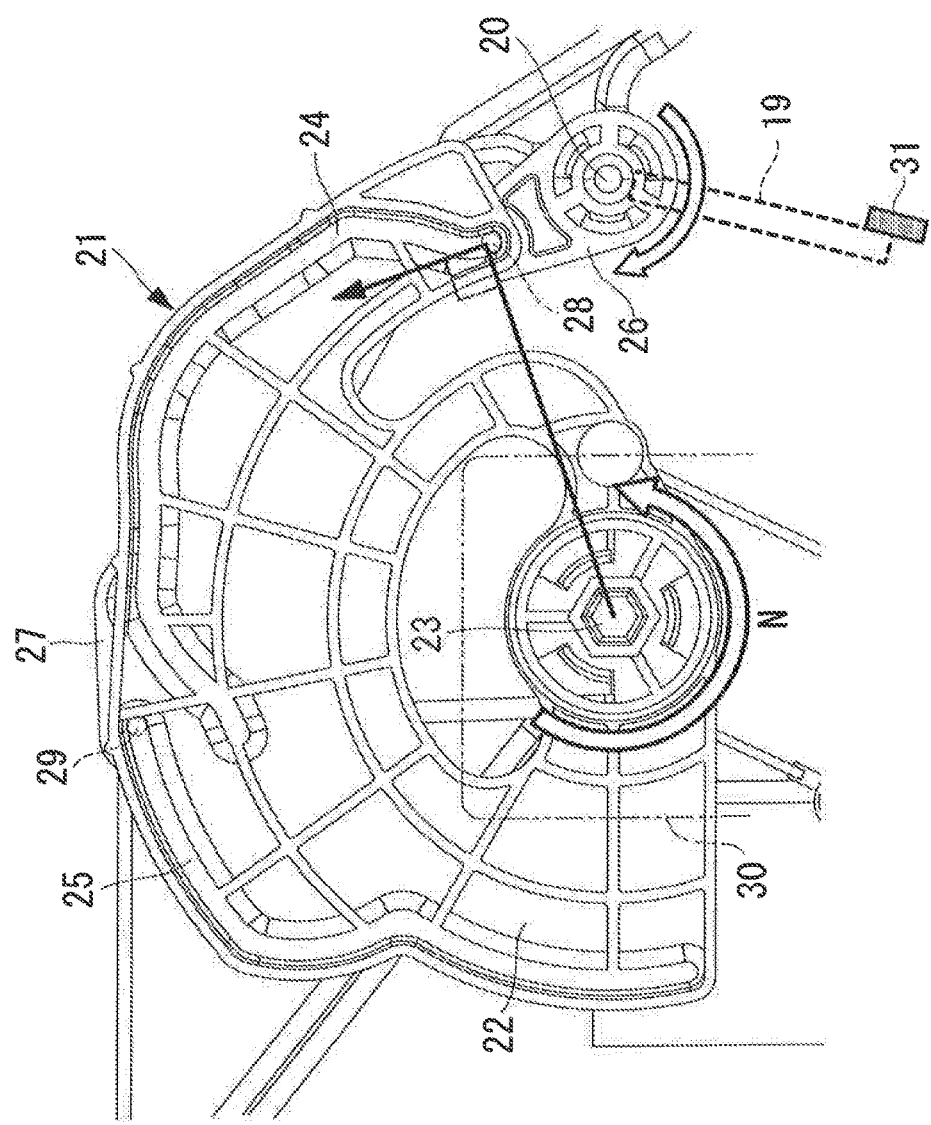
FIG. 2 is a partial side view of a damper opening/closing mechanism configured to open/close a damper.
Figure 3:
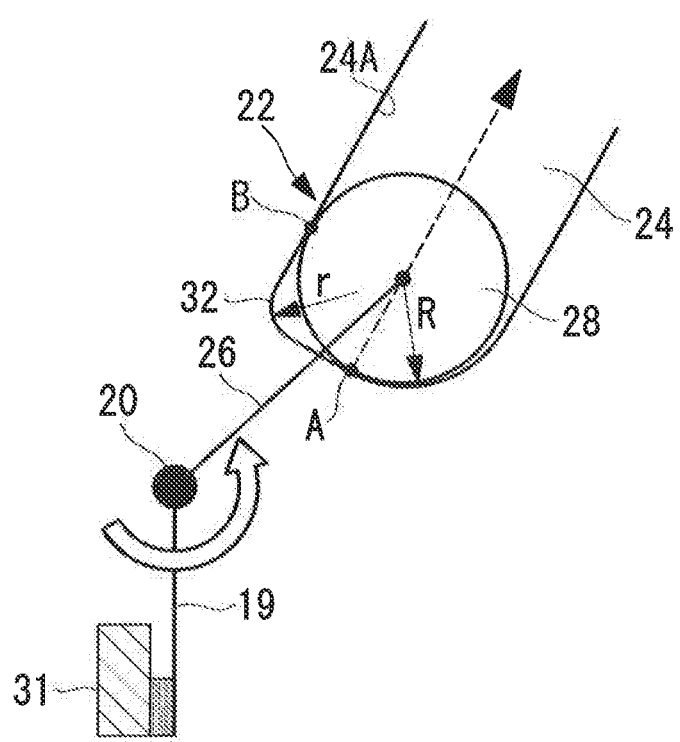
FIG. 3 is a view for describing a configuration of an end portion shape of a cam groove provided at a link plate of the damper opening/closing mechanism.

FIG. 1 illustrates a perspective view of a vehicle air-conditioning device of one embodiment of the present invention, FIG. 2 illustrates a partial side view of a damper opening/closing mechanism configured to open/close a damper, and FIG. 3 illustrates a view for describing a configuration of an end portion shape of a cam groove provided at a link plate of the damper opening/closing mechanism.

A vehicle air-conditioning device 11 of the present embodiment includes a heating ventilation and air conditioning (HVAC) unit 12 and a blower unit 13 integrally provided on one side of the HVAC unit 12.

The blower unit 13 includes a built-in fan and a built-in motor for pressure-feeding inner vehicle compartment air (also simply referred to as "internal air") or external air taken by an internal/external air switching device 14 toward the HVAC unit 12. Part of a fan case and part of a unit case 15 on a HVAC unit 12 side are commonly used, and therefore, the blower unit 13 is integrated with the HVAC unit 12. Note that the internal/external air switching device 14 is provided with an internal/external air switching damper between an internal air intake port and an external air intake port. Such a blower unit 13 is well known.

The HVAC unit 12 includes the unit case 15 integrated by assembly of multiple divided cases. By an evaporator, a heater core, an air mix damper, etc. arranged in an air flow path in the HVAC unit 12, the temperature of air sent from the blower unit 13 is adjusted to a set temperature. Such temperature-adjusted air is blown into a vehicle compartment through any of a differential blowing port 16, a face blowing port 17, a foot blowing port 18 opening downstream of the air flow path. In this manner, the inside of the vehicle compartment is temperature-adjusted. Such configuration and function are well known.

Three dampers including a face damper, a foot damper, and a differential damper are provided separately for the differential blowing port 16, the face blowing port 17, and the foot blowing port 18. Alternatively, two dampers including a single face/differential damper commonly used as a face damper and a differential damper, and a single foot damper, are provided. Each of the blowing ports 16, 17, 18 is opened/closed through these dampers, and therefore, a temperature-adjusted air blowing mode is selectively switchable to any of a face blowing mode, a foot blowing mode, a differential blowing mode, a differential/face blowing mode, a bi-level blowing mode, etc. Such a configuration is also well known.

The blowing mode switching damper of the present embodiment includes two dampers, i.e., a foot damper 19 and a not-shown face/differential damper. The foot damper 19 is rotatably supported through a damper shaft 20 in the unit case 15. Similarly, the face/differential damper is rotatably supported through a not-shown damper shaft in the unit case 15. Each damper is opened/closed by a damper opening/closing mechanism 21 disposed on a side surface of the unit case 15.

The damper opening/closing mechanism 21 includes a link plate 22 which is configured such that a center portion thereof is rotatably supported on the side surface of the unit case 15 through a shaft portion 23 and which is provided with two independent cam grooves 24, 25 at outer peripheral portions; damper levers 26, 27 fixed, on one end side, respectively to a shaft end of the damper shaft 20 of the foot damper 19 and a shaft end of the damper shaft of the face/differential damper and slidably fitted, on the other end side, respectively in the cam grooves 24, 25 through pins 28, 29 having a circular cross section; and a stepping motor 30 fixed on an outer surface side of the link plate 22 to rotatably drive the link plate 22 about the shaft portion 23.

In such a damper opening/closing mechanism 21, reference positioning (initialization) of the stepping motor 30 needs to be performed at the time of being initially connected to a power supply or the time of maintenance for the purpose of rotating the foot damper 19 and the face/differential damper to each blowing mode switching position through the damper opening/closing mechanism 21. As described above, such initialization is performed as follows: the link plate 22 is rotated such that the pin 28 of the damper lever 26 is positioned at one end portion of the cam groove 24 and that the foot damper 19 is in a closed state to press the foot damper 19 against a seal surface 31, for example. In a case where the direction of the damper lever 26 faces the direction of load on the pin 28, the damper lever 26 might rotate in the direction of opening the foot damper 19 upon initialization, leading to unstable initialization.

In the present embodiment, the shape of one end portion of the cam groove 24 is configured as in FIG. 3 for stably performing initialization even in the above-described case.

For slidably fitting the pin 28, the cam groove 24 has a groove width wider than the outer diameter of the pin 28 by predetermined dimensions. The pin 28 is fitted in the cam groove 24 with a certain clearance. An outer peripheral surface of the pin 28 having a curvature radius R with respect to the cam groove 24 contacts one end surface of the cam groove 24 at a point A when the link plate 22 rotates to rotate the foot damper 19 to a closed position contacting the seal surface 31.

Meanwhile, when the link plate 22 is rotated to rotate the damper lever 26 through the pin 28 slidably fitted in the cam groove 24, the outer peripheral surface of the pin 28 contacts a side wall surface of the cam groove 24 on the side pushing the pin 28, i.e., a side wall surface 24A in this case. Supposing that a contact point when the foot damper 19 is rotated to the closed position contacting the seal surface 31 is B, a connection surface 32 between the points A and B of one end surface of the cam groove 24 is in such a shape connected through a curved surface and/or a flat surface not contacting the outer peripheral surface of the pin 28 with the curvature radius R.

Specifically, the connection surface 32 between the points A and B of one end surface of the cam groove 24 is in such a shape that a plane passing through the above-described point A and an extending plane of the side wall surface 24A of the cam groove 24 passing through the above-described point B are connected through a curved surface having a curvature radius r smaller than the curvature radius R of the pin 28. When the foot damper 19 is rotated to the closed position, the outer periphery of the pin 28 of the damper lever 26 is securely housed in contact with the points A and B, and therefore, opening of the foot damper 19 by returning of the pin 28 along an arc surface of a groove end is prevented.

According to the present embodiment, the above-described configuration provides the following features and advantageous effects.

In the above-described damper opening/closing mechanism 21, the stepping motor 30 is driven through a controller to rotate the link plate 22 to the set position. In this manner, the foot damper 19 and the face/differential dampers are rotated respectively to the selected blowing mode positions. Accordingly, the temperature-adjusted air can be blown into the vehicle compartment through any of the differential blowing port 16, the face blowing port 17, and the foot blowing port 18.

That is, the cam grooves 24, 25 are rotated by rotation of the link plate 22, and the pins 28, 29 fitted respectively in the cam grooves 24, 25 are displaced along the shapes of the cam grooves 24, 25. In this manner, the damper levers 26, 27 rotate about the damper shaft 20 (the damper shaft of the face/differential damper is not shown), and the foot damper 19 and the face/differential damper rotate to the set positions. With this configuration, the blowing mode is switched to any of the face blowing mode, the foot blowing mode, the differential blowing mode, the differential/face blowing mode, and the bi-level blowing mode as described above, and then, the temperature-adjusted air is blown into the vehicle compartment.

Meanwhile, the damper opening/closing mechanism 21 is actuated as described above, and therefore, the stepping motor 30 needs to be initialized. Such initialization is performed upon initial connection of the stepping motor 30 to the power supply or upon maintenance. In this case, reference positioning (initialization) is performed in such a manner that a particular damper, the foot damper 19 in this case, is brought to the closed state. At this point, as illustrated in FIG. 3, the pin 28 of the damper lever 26 is positioned at one end portion of the cam groove 24, and the foot damper 19 contacts the seal surface 31. In this manner, the closed state is brought.

Then, when the foot damper 19 is brought to the closed state as described above, the pin 28 of the damper lever 26 contacts one end portion of the cam groove 24 at the points A and B, and the connection surface 32 between the points A and B has such a surface configuration that the connection surface 32 does not contact the outer peripheral surface of the pin 28 with the curvature radius R. Thus, the pin 28 is securely housed at one end portion of the cam groove 24.

Figure 4A:
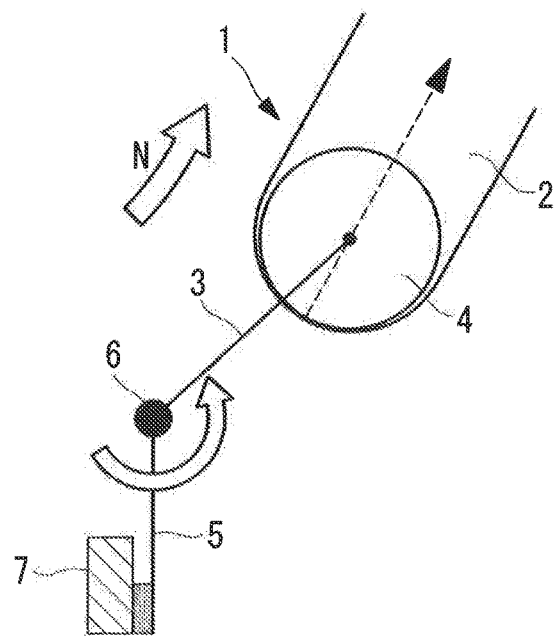
FIG. 4A is a view for describing a configuration of an end portion shape of a cam groove of a typical example corresponding to FIG. 3.
Figure 4B:
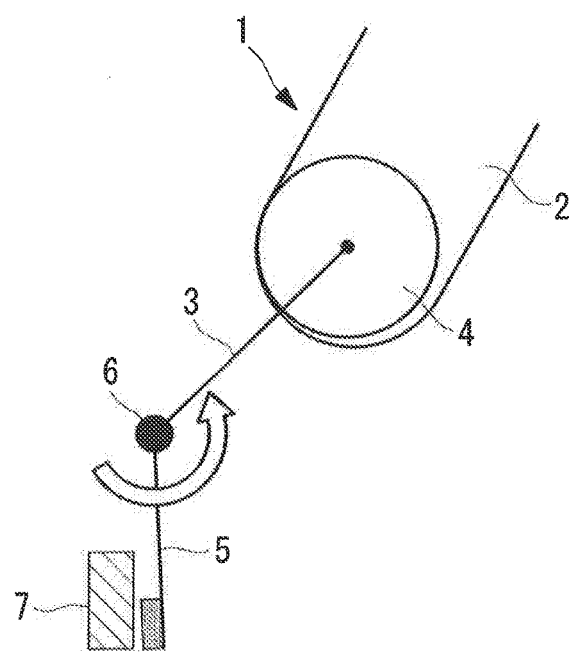
FIG. 4B is a view for describing operation of the cam groove of the typical example corresponding to FIG. 3 upon initialization.

The outer periphery of the pin 28 is securely housed in contact with the points A and B of one end portion of the cam groove 24 without any clearances. Thus, when the link plate 22 rotates the damper in a closing direction in such a state and torque in the direction of opening the foot damper 19 is applied to the damper lever 26, even if the direction of the damper lever 26 is the direction of load on the pin 28 as illustrated in FIG. 4(B), opening of the foot damper 19 when the pin 28 returns along the arc surface of the end portion of the cam groove 24 by a clearance due to the torque in the direction of opening the damper is not caused, and therefore, the stepping motor 30 can be initialized with the foot damper 19 being maintained at the closed position.

With this configuration, opening of the foot damper 19 due to rotation of the damper lever 26 when the pin 28 of the damper lever 26 returns on the arc surface by the clearance between the cam groove 24 and the pin 28 is not caused. Thus, the stepping motor 30 can be stably initialized, and the quality and reliability of the vehicle air-conditioning device 11 can be improved.

Moreover, one end portion of the cam groove 24 forms the connection surface 32 between the plane passing through the point A and the extending plane of the side wall surface 24A of the cam groove 24 passing through the point B through the curved surface having the curvature radius r smaller than the curvature radius R of the pin 28. Thus, when the link plate 22 is rotated to position the pin 28 of the damper lever 26 at one end portion of the cam groove 24 and bring the foot damper 19 to the closed state, the outer peripheral surface of the pin 28 contacts the point A of one end surface of the cam groove 24 and the point B of the side wall surface 24A of the cam groove 24, and therefore, the pin 28 can be securely housed at one end portion of the cam groove 24 without any movement clearances.

Thus, even when torque in a rotation direction is applied to the damper lever 26, the stepping motor 30 can be, in a state in which the foot damper 19 is maintained at the closed state, stably initialized without movement of the pin 28 at one end portion of the cam groove 24 regardless of the direction of the damper lever 26.

Note that the present invention is not limited to the aspect of the above-described embodiment, and modifications can be optionally made without departing from the gist of the present invention. For example, in the above-described embodiment, the example where the present invention is applied to the damper opening/closing mechanism 21 including the foot damper 19 and configured to open/close the blowing mode switching damper has been described. However, the present invention is not limited to the blowing mode switching damper, and needless to say, is also similarly applicable to other damper opening/closing mechanisms such as a temperature adjustment air mix damper and an internal/external air switching damper.

Moreover, the link plate 22 provided with the two cam grooves 24, 25 at the outer peripheral portions has been described. Needless to say, the number of cam grooves increases/decreases corresponding to the number of opening/closing dampers. Thus, the outer shape is changeable to various shapes according to a cam groove configuration.

Further, in the above-described embodiment, the example where the stepping motor 30 is initialized using the foot damper 19 has been described, but needless to say, may be initialized using other dampers.

EXPLANATION OF REFERENCE

11: vehicle air-conditioning device
19: foot damper (damper).
20: damper shaft
21: damper opening/closing mechanism
22: link plate
24, 25: cam groove
24A: side wall surface of cam groove
26, 27: damper lever
28, 29: pin
30: stepping motor
32: connection surface

The invention claimed is:

1. A damper opening/closing mechanism of a vehicle air-conditioning device, comprising:
    a link plate configured such that a center portion is rotatably supported and provided with a cam groove along an outer peripheral portion and the link plate is rotatably driven through a stepping motor;
    a damper lever including a pin to be slidably fitted in the cam groove and configured to rotate by movement of the pin through the cam groove; and
    a damper including a damper shaft having a shaft end coupled to the damper lever and configured to open/close by rotation of the damper shaft,
    wherein one end portion of the cam groove for reference positioning of the stepping motor is in such a shape that a curved surface and/or a flat surface not contacting an outer peripheral surface of the pin connects between points A and B, the point A being a point of point contact of an outer periphery of the pin with one end surface of the cam groove in a side view and the point B being a point of point contact of the outer periphery of the pin with a side wall surface of the cam groove in a side view when the damper is in a closed state.

2. The damper opening/closing mechanism of the vehicle air-conditioning device according to claim 1, wherein
    the one end portion of the cam groove is such a shape that a curved surface having a curvature radius r smaller than a curvature radius R of the pin connects between a plane passing through the point A and an extending plane of the side wall surface of the cam groove passing through the point B.

* * * * *